Nov. 24, 1936.    F. J. SCHWEITZER    2,061,852
FLOW BEAN VALVE
Filed June 12, 1935

INVENTOR
F. J. Schweitzer,
BY J. E. Maynard
ATTORNEY.

Patented Nov. 24, 1936

2,061,852

UNITED STATES PATENT OFFICE 2,061,852

FLOW BEAN VALVE

Frank J. Schweitzer, Brea, Calif.

Application June 12, 1935, Serial No. 26,134

2 Claims. (Cl. 251—34)

This invention is a valve of the type known in the oil field industry as a "flow bean", and which is effectively used to control the flow of fluids from the wells, either liquid or gas.

It is an object to provide a flow bean valve which affords a smooth, non-emulsifying stream flow and at the same time provide a calibrated means enabling the setting of the bean tip at a selective, definite position for securing a known or measured volume of flow.

Therefore, the invention broadly comprehends the combination with a Venturi throat or passage in the valve body of a control bean whose effective surface is so produced as to progressively increase the volume of flow in definite units of area of flow orifice.

That is to say, that the operator may adjust the valve to permit the flow of fluid through an orifice (surrounding the tip) which has a predetermined area the same as the area of a simple circular opening of known size, and by merely adjusting the tip the flow orifice may be increased or decreased to any desired area equal to the area of a circular hole of the desired unit of measure.

To facilitate adjustment the device includes a scale calibrated in units of any desired standard and here defined as graduations designated as 64ths of an inch, and commencing with 2/64ths and advancing along the scale by numerators increasing by two; the unit "2" meaning that the valve bean is open from its annular seat an amount such that the annular orifice has an area equal to that of a circle having a diameter of 2/64ths of an inch, and the advancing scale numbers showing position for setting the bean to obtain a flow orifice around the bean whose area equals that of a circle of the diameter indicated by the selected scale mark, up to, for example, an area of a circle of two inches in diameter. This size opening is indicated on the scale by the index "128" meaning that many 64ths in a two inch diameter.

The invention consists in certain advancements in this art as set forth in the ensuing disclosure and having, with the above, additional objects, and advantages as hereinafter developed, and whose construction, combinations and details of means, and the manner and method of operation will be made manifest in the description of the herewith illustrative embodiment; it being understood that modifications, variations and adaptations may be resorted to within the scope, principle and spirit of the invention as it is more directly claimed hereinafter.

Figures 1, 2, 3:
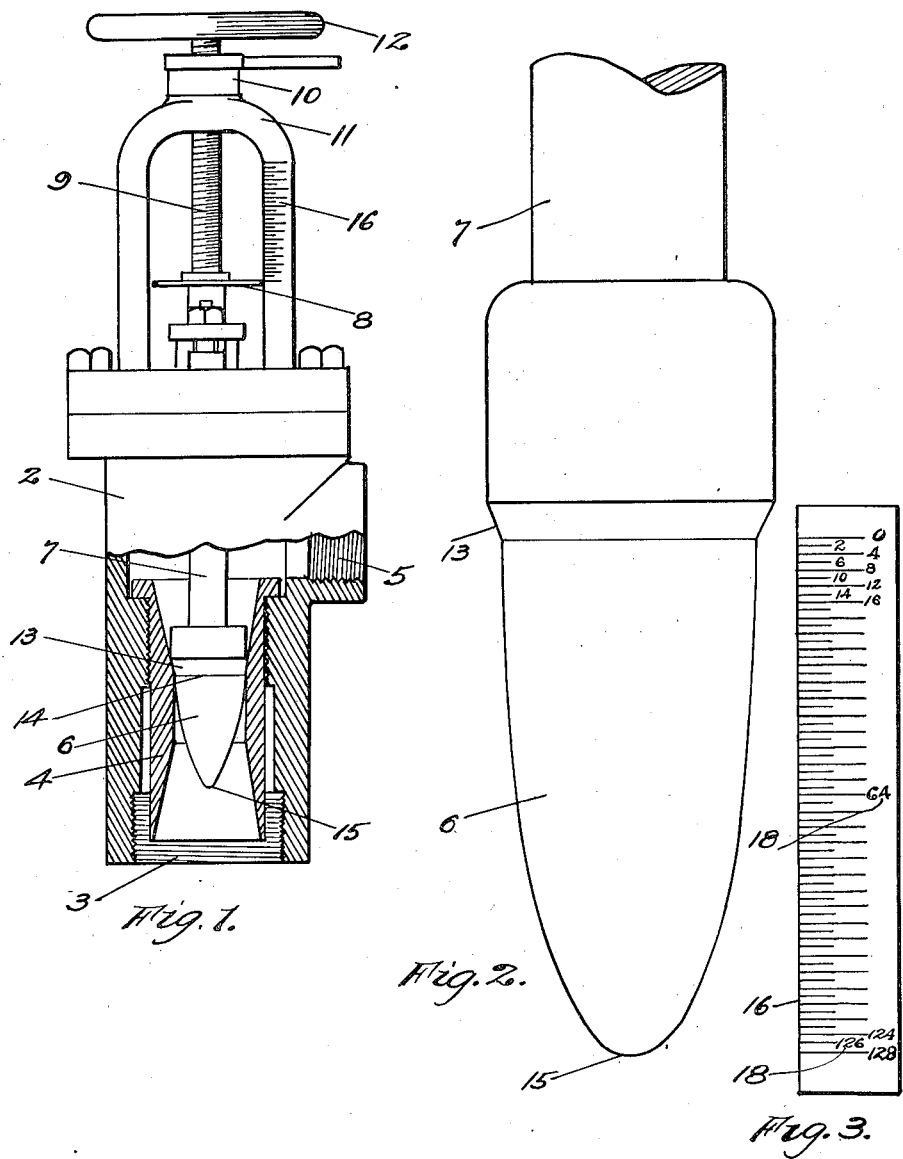
Figure 1 is a sectional, side elevation of the valve showing the flow bean closed.
Figure 2 is a side elevation of the plotted contour bean.
Figure 3 is a diagram of the scale or index member of the valve.

The valve includes a suitable shell 2 with an inlet 3 in which is disposed a Venturi tube leading to a discharge port 5.

Movably disposed in the tube 4 is a closure member or "tip" 6, more or less of acorn shape and having a stem 7 passing through the top of the valve and having an affixed pointer 8.

The stem is threaded at 9 for engagement with a fixed nut 10 on a fixed yoke 11 of the valve; the stem being provided with a hand-wheel 12 to facilitate rotation of the stem to effect opening or closing of the bean rim 13 as to the neck or seat line 14 of the tube 4.

The body 6 of the tip has a predetermined curved form commencing at the seating rim 13 and tapering down to the point 15 in such a contour that the annular orifice formed between the body 6 and the neck 14 of the tube will progressively increase in area according to predetermined unit steps of movement of the tip 6.

That is, the tip 6 is so shaped that in one step it will open the tube 4 to form an annular orifice whose area will equal the area of a given unit of measurement; say equal to the area of a circle of 2/64ths of an inch in diameter, and as the tip is moved relative to its seat in further steps of the same unit of movement the flow orifice will equal the area of a circle of each progressively increasing denomination in 64ths.

The pointer 8 is coordinate to a scale or index member 16 fixed on the yoke and this index member is calibrated in units representing steps of movement of the bean tip from its seat to form an annular flow orifice which, for any index point, will have an area equal to the area of a circle of a diameter shown by the index numerator 16 on the scale, here, for example, being in relation to 64ths of an inch (the scale is not divided into sections of this dimension). The length of the scale is in any desired ratio as to the length of the tip and is divided into equal sections according to the standard of measure adopted.

The measure of flow is made reliable and effective by the combination of the Venturi tube 4 and the specially contoured tip; the latter fixes the area of flow orifice and the former affording a passage of fluid with minimum of emulsification and eddy creation.

The tube 4 is renewable and may be of any desired throat form and size though the Venturi throat here shown is preferred.

The unit measure here adopted provides for calibrations evenly spaced without crowding and instead of using the numerator of the fraction the area of the relative circle may be substituted at will as the index for the adjustment of the bean tip.

What is claimed is:

1. In a gaged step flow bean valve, a flow port part and a cooperative closure tip having a smooth, effective curved surface and said port having a minimum diameter equal to the major effective diameter of said tip and the latter characterized by a contour of such curve from its major diameter toward its terminal that at each evenly spaced step of axial shift it will produce a uniform change in the area of the passage between the tip and the minimum port diameter and the area of which passage, at each step, will correspond to the area of a circle having the same area as the passage and having a diameter proportional to the axial shift of the tip; said tip being characterized by an upwardly diverging, conical portion whose smaller end is of the same diameter as the large upper end of, and springs from, said curved tip, and said flow part having an outlet passage whose wall is conically concentric with said conical portion of the tip, and the latter forming a relatively short seating portion; whereby to form a smooth, straight, upward channel for flow of liquid passing between the seatable portion of the tip and the outlet passage wall when the tip is in open relation to eliminate emulsifying effect in flowing liquid.

2. In a flow bean valve, a flow port part and a closure member cooperating therewith, said part having an inlet bore from which extends an upwardly diverging conical outlet passage surface to the outlet end of said part, and said member including a short seating shoulder which is conically concentric with the said conical passage surface and seats on the smaller end thereof to close the port; the said surface being relatively elongated as to the seating shoulder; and the closure having a tip whose upper end joins with and is of the same diameter as the smaller end of said shoulder and converges downward to an axial terminal: said conical shoulder and its relative concentric conical passage surface coacting to form a straight, upward flow space from the small end of the outlet passage to facilitate discharge flow with a minimum turbulence.

FRANK J. SCHWEITZER.